United States Patent
Tsukuda et al.

(10) Patent No.: US 6,379,832 B1
(45) Date of Patent: Apr. 30, 2002

(54) BASE TUBE FOR FUEL CELL AND MATERIAL FOR BASE TUBE

(75) Inventors: Hiroshi Tsukuda; Nagao Hisatome; Yoshiharu Watanabe; Akihiro Yamashita; Kenichiro Kosaka; Toru Houjyou, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/490,857

(22) Filed: Jan. 24, 2000

(30) Foreign Application Priority Data

Jul. 19, 1999 (JP) ........................................... 11-204278

(51) Int. Cl.$^7$ ............................................... H01M 8/12
(52) U.S. Cl. ............................................ 429/33; 429/30
(58) Field of Search ............................... 429/31–33, 30, 429/44

(56) References Cited

U.S. PATENT DOCUMENTS

| | | | | |
|---|---|---|---|---|
| 4,598,028 A | * | 7/1986 | Rossing | 429/30 |
| 5,122,425 A | * | 6/1992 | Yoshida | 429/33 |
| 5,217,822 A | * | 6/1993 | Yoshida | 429/33 |
| 5,426,003 A | * | 6/1995 | Spengler | 429/27 |
| 5,543,239 A | * | 8/1996 | Virkar | 429/33 |
| 5,591,537 A | * | 1/1997 | Bagger | 429/33 |
| 5,686,198 A | * | 11/1997 | Kuo | 429/30 |
| 6,207,314 B1 | * | 3/2001 | Tsukuda | 429/44 |
| 6,312,847 B1 | * | 11/2001 | Tsukuda | 429/31 |

FOREIGN PATENT DOCUMENTS

| | | | | |
|---|---|---|---|---|
| EP | 1071150 | * | 1/2001 | H01M/8/12 |
| JP | 2000106192 | * | 4/2000 | H01M/4/86 |

* cited by examiner

*Primary Examiner*—Gabrielle Brouillette
*Assistant Examiner*—Mark Ruthkosky
(74) *Attorney, Agent, or Firm*—Anderson Kill & Olick, P.C.; Eugene Lieberstein; Michael N. Meller

(57) ABSTRACT

The present invention discloses a base tube for a fuel cell produced by forming a film of a fuel electrode and a film of an air electrode on a surface of the base tube, the base tube comprising a mixture of a raw material for the base tube, and coarse particles, whereby the mixture shrinks nonuniformly when sintered to increase the porosity of the base tube. Thus, the gas permeability and the cell electrical efficiency can be increased.

12 Claims, 1 Drawing Sheet

BASE TUBE FOR FUEL CELL AND MATERIAL FOR BASE TUBE

BACKGROUND OF THE INVENTION

1. Field of the Invention

This invention relates to a base tube for a fuel cell, whose porosity and pore diameter are increased to improve the power generation characteristics of the resulting fuel cell, and a material for the base tube.

2. Description of the Related Art

FIG. 1 shows the outline of a base tube of a thermal spray type solid electrolyte fuel cell.

As shown in FIG. 1, a thermal spray type solid electrolyte fuel cell (SOFC) is produced in the following manner: A cermet of Ni and yttria-stabilized zirconia (YSZ) is provided in a film form by plasma spraying on a porous cylindrical base tube 1 of calcia-stabilized zirconia (CSZ) to serve as a fuel electrode 2. On this fuel electrode 2, oxygen ion-conductive YSZ is provided in a film form by plasma spraying to serve as an electrolyte 3. On this electrolyte 3, $LaCoO_3$ is provided in a film form by acetylene flame spraying to serve as an air electrode 4. In this manner, a fuel cell is constructed. Finally, the fuel electrode 2 and the air electrode 4 are connected together in series by an electrically conductive connecting material (interconnector) 5 in a film form composed of a cermet of NiAl and alumina.

The production of a fuel cell by thermal spraying as an earlier technology is laborious and costly, and should be decreased in cost. Thus, a co-sinter type fuel cell, which is composed of a base tube, a fuel electrode and an electrolyte sintered integrally, and which requires a reduced number of sintering operations, has been developed. However, this type of fuel cell poses the problem of insufficient gas permeability of the base tube for achieving desired power generation characteristics.

Another problem with the base tube of the earlier technology is marked deterioration, at a rapid temperature raising and lowering rate during a heat cycle. In detail, with a temperature raising and lowering rate of not higher than 50° C./hour, the performance of the cell after the heat cycle does not differ from its performance before the heat cycle. At a temperature raising and lowering rate in excess of 50° C./hour, on the other hand, an output drop of about 10% may occur per heat cycle. When fuel cells are used as a gathering, a temperature raising and lowering rate, if not made very slow, exceeds 50° C./hour in a part of the fuel cell gathering, thereby damaging the cell. Thus, there is a demand for a cell which is not damaged even at a rapid temperature raising and lowering rate of about 200° C./hour.

Another challenge for the base tube is to improve the fuel utilization factor. The fuel utilization factor of the base tube according to the earlier technology is about 70% of fuel charged. An improvement achieved in the fuel utilization factor can lead to an increase in the efficiency of the fuel cell.

SUMMARY OF THE INVENTION

In light of the above-described circumstances, the present invention aims to provide a base tube for an integral sinter type fuel cell, the base tube having increased porosity and pore diameter to improve the power generation characteristics of the fuel cell, and the base tube being free from damage at a rapid temperature raising and lowering rate, and having a higher fuel utilization factor; and a material for the base tube.

A first aspect of the invention is a base tube for a fuel cell, the base tube comprising a mixture of a raw material for the base tube, and coarse particles, whereby the mixture shrinks nonuniformly when sintered to increase the porosity of the base tube. Thus, the gas permeability performance can be improved, and the electrical efficiency of the cell can be increased.

A second aspect of the invention is the base tube for a fuel cell according to the first aspect of the invention, wherein the mean particle diameter of the raw material for the base tube is 0.5 to 2 $\mu$m, and the particle diameters of the coarse particles are 5 $\mu$m or more. Thus, the porosity can be increased.

A third aspect of the invention is the base tube for a fuel cell according to the first or second aspect of the invention, wherein the mixture contains 10 to 40% by weight of the coarse particles. Thus, the porosity can be increased.

A fourth aspect of the invention is the base tube for a fuel cell according to the first to third aspects of the invention, wherein the raw material for the base tube is calcia-stabilized zirconia (CSZ). Thus, the porosity can be increased to 20% compared with the conventional value of 15%, so that the electrical efficiency of the cell can be increased.

A fifth aspect of the invention is a base tube for a fuel cell, wherein a raw material for the base tube is fine particles of calcia-stabilized zirconia (CSZ), and fine particles having the same particle diameter as the particle diameter of the raw material are mixed with the raw material, the fine particles being selected from one or more of NiO, CoO, FeO, $Fe_2O_3$, $CaTiO_3$, $SrTiO_3$, and $BaTiO_3$, whereby a mixture of the fine particles and the raw material shrinks nonuniformly when sintered to increase the porosity of the base tube. Thus, the electrical efficiency of the cell can be increased.

A sixth aspect of the invention is the base tube for a fuel cell according to the fifth aspect of the invention, wherein the mean particle diameter of the raw material for the base tube is 0.5 to 2 $\mu$m. Thus, the electrical efficiency of the cell can be increased.

A seventh aspect of the invention is the base tube for a fuel cell according to the fifth or sixth aspect of the invention, wherein the mixture contains 10 to 40% by weight of the fine particles.

An eighth aspect of the invention is a base tube for a fuel cell, wherein a raw material for the base tube is calcia-stabilized zirconia (CSZ) having a mean particle diameter of 0.5 to 2 $\mu$m, and coarse particles having particle diameters of 5 $\mu$m or more are mixed with the raw material, the coarse particles being selected from one or more of NiO, CoO, FeO, $Fe_2O_3$, $CaTiO_3$, $SrTiO_3$, and $BaTiO_3$, whereby a mixture of the coarse particles and the raw material shrinks nonuniformly when sintered to increase the porosity of the base tube. Thus, the electrical efficiency of the cell can be increased.

A ninth aspect of the invention is the base tube for a fuel cell according to the eighth aspect of the invention, wherein the mixture contains 10 to 40% by weight of the coarse particles. Thus, the electrical efficiency of the cell can be increased.

A tenth aspect of the invention is a base tube for a fuel cell, wherein a raw material for the base tube is calcia-stabilized zirconia (CSZ) having a mean particle diameter of 0.5 to 2 $\mu$m, and fine particles having particle diameters of 0.5 to 3 $\mu$m, and coarse particles having particle diameters of 5 $\mu$m or more are mixed with the raw material, the fine particles being selected from one or more of NiO, CoO, FeO, $Fe_2O_3$, $CaTiO_3$, $SrTiO_3$, and $BaTiO_3$, and the coarse particles being selected from one or more of NiO, CoO, FeO, $Fe_2O_3$, $CaTiO_3$, $SrTiO_3$, and $BaTiO_3$, whereby a mixture of the fine particles, the coarse particles and the raw material shrinks nonuniformly when sintered to increase the porosity of the base tube. Thus, the electrical efficiency of the cell can be increased.

An eleventh aspect of the invention is the base tube for a fuel cell according to the tenth aspect of the invention, wherein the mixture contains 5 to 30% by weight of the fine particles and 5 to 30% by weight of the coarse particles. Thus, the electrical efficiency of the cell can be increased.

A twelfth aspect of the invention is a material for a base tube for a solid electrolyte fuel cell, the solid electrolyte fuel cell being produced by laminating a film of a fuel electrode, a film of an electrolyte, and a film of an air electrode in this order on a surface of the base tube, the material for the base tube comprising a mixture of a raw material for the base tube, and coarse particles, the raw material being calcia-stabilized zirconia (CSZ) having a mean particle diameter of 0.5 to 2 μm, and the coarse particles having particle diameters of 5 μm or more and being selected from one or more of NiO, CoO, FeO, $Fe_2O_3$, $CaTiO_3$, $SrTiO_3$, and $BaTiO_3$. Thus, the electrical efficiency of the cell can be increased.

A thirteenth aspect of the invention is the base tube for a fuel cell according to the twelfth aspect of the invention, wherein the mixture contains 10 to 40% by weight of the coarse particles. Thus, the electrical efficiency of the cell can be -increased.

A fourteenth aspect of the invention is a material for a base tube for a solid electrolyte fuel cell, the solid electrolyte fuel cell being produced by laminating a film of a fuel electrode, a film of an electrolyte, and a film of an air electrode in this order on a surface of the base tube, the material for the base tube comprising a mixture of calcia-stabilized zirconia (CSZ) having a mean particle diameter of 0.5 to 2 μm, 5 to 30% by weight, based on the CSZ, of fine particles having a mean particle diameter of 0.5 to 3 μm, the fine particles being one or more of NiO, CoO and $Fe_2O_3$, and 5 to 30% by weight, based on the CSZ, of coarse particles having a mean particle diameter of 5 μm or more, the coarse particles being one or more of NiO, CoO, $Fe_2O_3$ and CaO-stabilized $ZrO_2$, whereby the mixture shrinks nonuniformly when sintered to increase the porosity of the base tube. Thus, the electrical efficiency of the cell can be increased.

A fifteenth aspect of the invention is a material for a base tube for a solid electrolyte fuel cell, the solid electrolyte fuel cell being produced by laminating a film of a fuel electrode, a film of an electrolyte, and a film of an air electrode in this order on a surface of the base tube, the material for the base tube comprising a mixture of calcia-stabilized zirconia (CSZ) having a mean particle diameter of 0.5 to 2 μm, 5 to 30% by weight, based on the CSZ, of one or more of $CaTiO_3$, $SrTiO_3$, $BaTiO_3$, and CaO-stabilized $ZrO_2$ having a mean particle diameter of 0.5 μm or more, and 5 to 30% by weight, based on the CSZ, of one or more of NiO, CoO, $Fe_2O_3$ having a mean particle diameter of 5 μm or more, whereby the mixture shrinks nonuniformly when sintered to increase the porosity of the base tube. Thus, the electrical efficiency of the cell can be increased.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE PREFERRED EMBODIMENTS

Figure 1:
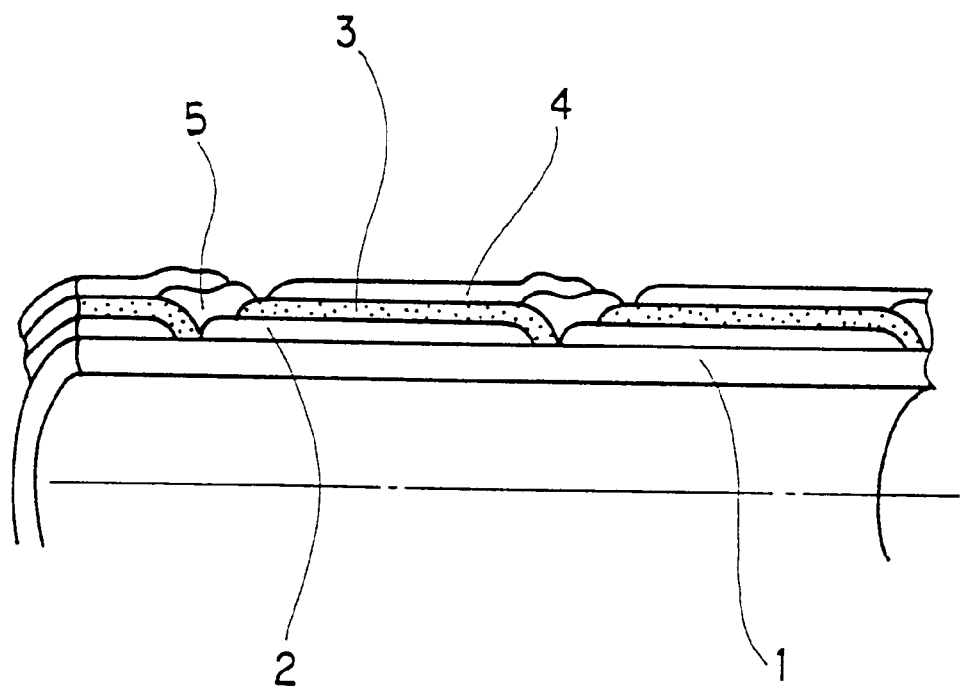
FIG. 1 is a schematic view of a base tube for a thermal spray type solid electrolyte fuel cell.

Preferred embodiments of the present invention will now be described, but it should be understood that the invention is not restricted thereby.

(1) A composite material for the base tube of the invention comprises a mixture of a raw material for the base tube, and coarse particles, so that the mixture shrinks nonuniformly during sintering to increase the porosity of the resulting base tube. The invention, which makes shrinkage nonuniform during sintering to increase the porosity, improves gas permeability. According to this invention, not only the porosity of the base tube, but also the mean pore diameter of the base tube can be increased, so that gas permeability can be further improved.

The raw material for the base tube in the invention is fine particles of calcia-stabilized zirconia (CSZ) having a mean particle diameter of about 0.5 to 2 μm. The coarse particles mixed with the fine particles may be calcia-stabilized zirconia (CSZ) having a mean particle diameter of 5 μm or more, preferably about 10 μm.

The raw material for the base tube is not restricted, and MgO—$MgAl_2O_4$, $CaTiO_3$—$MgAl_2O_4$, $MgTiO_3$—$MgAl_2O_4$, and $BaTiO_3$—$MgAl_2O_4$ can be exemplified instead of the calcia-stabilized zirconia (CSZ).

The upper limit of the particle diameter of the coarse particles added is not limited, and even a particle diameter of about 500 μm enables the invention to exhibit the intended effect.

The content of the coarse particles is not restricted, but it is preferably 10 to 40% by weight. If it is less than 10% by weight, the increase in the porosity will be small. If it is more than 40% by weight, a further increase in the porosity will not be achieved.

The sintering temperature during production of the base tube of the invention is preferably 1,300 to 1,500° C. If it is lower than 1,300° C., the electrolyte and the interconnector will be insufficient in densification. With sintering at a temperature above 1,500° C., densification of the fuel electrode will be accelerated, producing unfavorable results.

(2) Alternatively, the base tube of the invention comprises a mixture of the calcia-stabilized zirconia (CSZ) as the raw material for the base tube, and a metal oxide. Because of the addition of the metal oxide, the metal oxide is reduced and'shrinks during power generation, thereby generating pores anew, increasing the pore diameters, and eventually improving the gas permeability. Since the porosity can be. increased, and the mean pore diameter also increased, the gas permeability can be improved.

The metal oxide added is fine particles of one or more members selected from the group consisting of NiO, CoO, FeO and $Fe_2O_3$. Since the metal oxide is added, shrinkage of the mixture can be made nonuniform at the time of sintering to increase the porosity.

The particle diameter of the metal oxide may be 5 μm or more, preferably about 20 μm, rather than the same particle diameter as the particle diameter of the raw material. In this case, increases in the porosity and the pore diameter can be realized, owing to synergy between a shrinkage effect due to reduction of the added metal oxide during power generation and a shrinkage effect due to the increased particle diameter of the added metal oxide during sintering.

The content of the metal oxide is not restricted, but it is preferably 5 to 40% by weight, more preferably 10 to 30% by weight. If it is less than 5% by weight, the increase in the porosity will be small. If it is more than 40% by weight, a further increase in the porosity will not be achieved.

By adding fine particles and coarse particles of the metal oxide in predetermined proportions, the porosity can be increased, the electrical efficiency of the cell can be increased, a leak increase during a heat cycle can be curbed, and the fuel utilization factor can be increased.

That is, the material for the base tube according to the invention comprises a mixture of CaO-stabilized $ZrO_2$ as the raw material for the base tube, 5 to 30% by weight, based on the CaO-stabilized $ZrO_2$, of fine particles having a mean particle diameter of 0.5 to 3 μm, the fine particles being one or more of NiO, CoO and $Fe_2O_3$, and 5 to 30% by weight, based on the CaO-stabilized $ZrO_2$, of coarse particles having a mean particle diameter of 5 μm or more, the coarse particles being one or more of NiO, CoO, $Fe_2O_3$ and CaO-stabilized $ZrO_2$.

Alternatively, the material for the base tube according to the invention comprises a mixture of CaO-stabilized $ZrO_2$ as the raw material for the base tube, 5 to 30% by weight, based on the CaO-stabilized $ZrO_2$, of one or more of titania-derived composite oxides, such as $CaTiO_3$, $SrTiO_3$, and $BaTiO_3$, and CaO-stabilized $ZrO_2$, each having a mean particle diameter of 0.5 μm or more, and 5 to 30% by weight, based on the CaO-stabilized $ZrO_2$, of one or more of NiO, CoO, and $Fe_2O_3$ having a mean particle diameter of 5 μm or more.

The upper limit for the particle diameter of the metal oxide added is about 200 μm, if the metal oxide is NiO, CoO, FeO, or $Fe_2O_3$; or about 500 to 700 μm, if the metal oxide is $CaTiO_3$, $SrTiO_3$, or $BaTiO_3$, for the following reasons: In case of NiO, CoO, FeO, or $Fe_2O_3$, when the particle diameter is 200 μm or more, thermal shrinkage occurs even in a reducing atmosphere during power generation by the fuel cell, and the strength of the base tube decreases. In case of a titania-derived composite oxide such as $CaTiO_3$, no thermal shrinkage takes place even in a reducing atmosphere during power generation. Thus, the base tube is consistent with the electrolyte film in terms of thermal expansion, so that the base tube does not decrease in strength. Consequently, the leak increase during heat cycle can be suppressed.

According to the present invention, chromia-derived composite oxides such as $Cr_2O_3$, or chromium-based lanthanum composite oxides such as $LaCrO_3$ can be exemplified instead of the titania-derived composite oxides.

EXAMPLES AND TEST EXAMPLES

The present invention will be described in more detail with reference to Examples and Test Examples, which in no way limit the invention.

Test Example 1

80% by weight of a CSZ raw material with a mean particle diameter of 1 μm, and 20% by weight of coarse CSZ particles with a particle diameter of 10 μm were mixed, and sintered at 1,350° C.

Test Example 2

80% by weight of a CSZ raw material with a mean particle diameter of 1 μm, and 20% by weight of an NiO material with a particle diameter of 1 μm were mixed, and sintered at 1,350° C.

Test Example 3

80% by weight of a CSZ raw material with a mean particle diameter of 1 μm, and 20% by weight of an NiO material with a particle diameter of 20 μm were mixed, and sintered at 1,350° C.

Referential Example 1

As a control, a CSZ raw material with a mean particle diameter of 1 μm was used alone, and sintered in the same way.

The porosity, pore diameter, and cell electrical efficiency of each of the resulting sinters are shown in Table 1.

TABLE 1

|  | CSZ raw material | NiO material | Porosity | Pore diameter | Cell electrical efficiency* |
| --- | --- | --- | --- | --- | --- |
| Ref. Ex. 1 | Particle diameter 1 μm: 100% | None | 15% | 0.7 μm | 0.12 |
| Test Ex. 1 | Particle diameter 1 μm: 80% Particle diameter 10 μm: 20% | None | 20% | 0.7 μm | 0.31 |
| Test Ex. 2 | Particle diameter 1 μm: 80% | Particle diameter 1 μm: 20% | 25% | 0.7 μm | 0.37 |
| Test Ex. 3 | Particle diameter 1 μm: 80% | Particle diameter 10 μm: 20% | 30% | 1.2 μm | 0.44 |

*Ratio of power output to fuel input

As shown in Table 1, the base tubes of the Test Examples all increased in the porosity and improved in the cell electrical efficiency in comparison with the Referential Example. Furthermore, as shown in Test Example 3, the addition of the metal material and the associated further increase in the particle diameter synergistically resulted in a further improvement in the cell electrical efficiency.

Test Examples 1 to 19, Comparative Examples 1 to 7, Examples 20 to 27, and Comparative Examples 8 to 11>

Tables 2 and 3 show the compositions of a composite material for a base tube (base material portion) comprising a porous tube according to the present invention indicated in FIG. 1.

On the surface of the base tube 1, there were laminated a 100 μm thick fuel electrode 2 comprising Ni-zirconia thermit, a 100 μm thick electrolyte 3 comprising YSZ, and a 1,000 μm thick air electrode 4 comprising $LaMnO_3$ doped with Sr in a proportion of 0.1. Further, a conductive connecting material 5 comprising $LaCrO_3$ was laminated for connecting the fuel electrode 2 with the air electrode 4 to make a cell.

Rapid temperature raising and lowering cycles of the cell were repeated, and then changes in its leak were compared. The porosity and the cell electrical efficiency were also measured. The results are shown in Tables 2 and 3. The compositions in the Examples that are shown in Tables 2 and 3 successfully suppressed the leak increase. The fuel utilization factor was also increased.

In the present Examples, the materials indicated in Tables 2 and 3 were prepared for use as ceramic materials for the base tube 1. The base tube 1 was prepared by extrusion.

Methyl cellulose, glycerin, water, and a stearate emulsion as a lubricant were used as extrusion auxiliaries. The amounts of these auxiliaries used were 4 parts by weight, 5 parts by weight, 10 parts by weight, and 0.2 part by weight for 100 parts by weight of the ceramic materials. The stearate emulsion had a solids concentration of 15% by weight, and contained water as a dispersion medium.

Production of the base tube according to the present Examples is described below.

First, the ceramic materials and methyl cellulose were weighed in given proportions, placed in a high speed mixer, and mixed for 3 minutes. Then, water, glycerin, and a stearate emulsion were weighed, and added to the mixture, followed by mixing for 1 minute. Then, the mixture was kneaded by means of a twin screw kneader, and formed into a cylindrical product with the use of an extruder. After formation, the product was dried for 24 hours at 60° C., and coated with materials for electrodes. Then, the coated product was heat treated for 2 hours at 1,400° C. to make a fuel cell.

Each of the resulting cells was subjected to 5 cycles of temperature raising and lowering from room temperature to the power generation temperature and vice versa at a rate of 200° C./hour. Changes in cell performance were examined in this manner. The results of the Examples according to the invention are shown in Tables 2 and 3, along with Comparative Examples outside the scope of the invention for elucidating the effects of the invention.

TABLE 2

| | Composition (% by weight) | | | | | | | | | Properties of cell | | | | |
|---|---|---|---|---|---|---|---|---|---|---|---|---|---|---|
| | CaO-stabilized ZrO$_2$ | NiO | | | | | | | | Leak increase during heat cycle | Fuel utilization factor | Cell strength | Porosity | Cell electrical |
| Mean Particle diameter ($\mu$m) | 1.2 | 0.2 | 0.5 | 1.5 | 3.0 | 5 | 20 | 200 | 300 | (%/cycle) | (%) | (kg/mm$^2$) | (%) | efficiency |
| Ex. 1  | 90 |    | 5  |    | 5  |    |    |    |    | 0    | 82 | 4.3 | 30 | 0.37 |
| Ex. 2  | 65 |    | 5  |    | 30 |    |    |    |    | 0    | 85 | 3.8 | 34 | 0.39 |
| Ex. 3  | 90 |    | 5  |    |    | 5  |    |    |    | 0    | 83 | 3.5 | 32 | 0.37 |
| Ex. 4  | 65 |    | 5  |    |    | 30 |    |    |    | 0    | 88 | 3.3 | 38 | 0.40 |
| Ex. 5  | 65 |    | 30 |    | 5  |    |    |    |    | 0    | 80 | 4.2 | 26 | 0.34 |
| Ex. 6  | 40 |    | 30 |    | 30 |    |    |    |    | 0    | 83 | 3.9 | 31 | 0.35 |
| Ex. 7  | 65 |    | 30 |    |    | 5  |    |    |    | 0    | 83 | 3.5 | 31 | 0.35 |
| Ex. 8  | 40 |    | 30 |    |    | 30 |    |    |    | 0    | 85 | 3.3 | 34 | 0.36 |
| Ex. 9  | 90 |    |    | 5  | 5  |    |    |    |    | 0    | 80 | 3.2 | 26 | 0.33 |
| Ex. 10 | 65 |    |    | 5  | 30 |    |    |    |    | 0    | 85 | 3.4 | 33 | 0.38 |
| Ex. 11 | 90 |    |    | 5  |    | 5  |    |    |    | 0    | 82 | 4.1 | 30 | 0.34 |
| Ex. 12 | 65 |    |    | 5  |    | 30 |    |    |    | 0    | 88 | 3.8 | 38 | 0.40 |
| Ex. 13 | 65 |    |    | 30 | 5  |    |    |    |    | 0    | 83 | 3.5 | 32 | 0.35 |
| Ex. 14 | 40 |    |    | 30 | 30 |    |    |    |    | 0    | 86 | 3.8 | 37 | 0.39 |
| Ex. 15 | 65 |    |    | 30 |    | 5  |    |    |    | 0    | 83 | 3.4 | 31 | 0.35 |
| Ex. 16 | 40 |    |    | 30 |    | 30 |    |    |    | 0    | 88 | 3.5 | 38 | 0.40 |
| Ex. 17 | 90 |    | 5  |    |    |    | 5  |    |    | 0    | 80 | 3.8 | 27 | 0.35 |
| Ex. 18 | 60 |    | 20 |    |    |    | 20 |    |    | 0    | 85 | 3.5 | 34 | 0.39 |
| Ex. 19 | 40 |    |    | 30 |    |    | 30 |    |    | 0    | 88 | 3.3 | 38 | 0.40 |
| Comp. Ex. 1 | 60 | 20 |    |    | 20 |    |    |    |    | 0    | 55 | 3.5 | 17 | 0.13 |
| Comp. Ex. 2 | 60 |    | 20 |    |    |    |    | 20 |    | 0    | 84 | 1.4 | 34 | 0.37 |
| Comp. Ex. 3 | 60 | 20 |    |    |    |    |    | 20 |    | 0    | 82 | 1.2 | 29 | 0.34 |
| Comp. Ex. 4 | 40 |    | 20 |    |    |    |    |    | 40 | 0    | 88 | 0.9 | 38 | 0.37 |
| Comp. Ex. 5 | 78 |    | 20 |    |    | 2  |    |    |    | 0    | 50 | 3.8 | 14 | 0.11 |
| Comp. Ex. 6 | 40 |    | 40 |    | 20 |    |    |    |    | 0    | 55 | 4.4 | 16 | 0.12 |
| Comp. Ex. 7 | 78 |    | 2  |    | 20 |    |    |    |    | -1.5 | 80 | 4.3 | 27 | 0.36 |

TABLE 3

| | Composition (% by weight) | | | | | | | | Properties of cell | | | | |
|---|---|---|---|---|---|---|---|---|---|---|---|---|---|
| | CaO-stabilized ZrO$_2$ | NiO | CoO | Fe$_2$O$_3$ | NiO | CoO | CoO | Fe$_2$O$_3$ | Leak increase during heat cycle | Fuel utilization factor | Cell strength | Porosity | Cell electrical |
| Mean Particle diameter ($\mu$m) | 1.2 | 1.5 | 1.5 | 1.5 | 20 | 20 | 200 | 20 | (%/cycle) | (%) | (kg/mm$^2$) | (%) | efficiency |
| Ex. 20 | 60 | 20 |    |    | 20 |    |    |    | 0 | 84 | 3.7 | 34 | 0.38 |
| Ex. 21 | 60 | 20 |    |    |    |    |    | 20 | 0 | 83 | 3.6 | 32 | 0.34 |
| Ex. 22 | 60 |    | 20 |    | 20 |    |    |    | 0 | 84 | 3.5 | 34 | 0.38 |
| Ex. 23 | 60 |    | 20 |    |    | 20 |    |    | 0 | 84 | 3.5 | 33 | 0.38 |
| Ex. 24 | 60 |    | 20 |    |    |    | 20 |    | 0 | 83 | 3.8 | 32 | 0.34 |
| Ex. 25 | 60 |    |    | 20 | 20 |    |    |    | 0 | 83 | 3.7 | 33 | 0.34 |

TABLE 3-continued

| Mean Particle diameter (μm) | Composition (% by weight) | | | | | | | | Properties of cell | | | | |
| --- | --- | --- | --- | --- | --- | --- | --- | --- | --- | --- | --- | --- | --- |
| | CaO-stabilized ZrO$_2$ 1.2 | NiO 1.5 | CoO 1.5 | Fe$_2$O$_3$ 1.5 | NiO 20 | CoO 20 | CoO 200 | Fe$_2$O$_3$ 20 | Leak increase during heat cycle (%/cycle) | Fuel utilization factor (%) | Cell strength (kg/mm$^2$) | Porosity (%) | Cell electrical efficiency |
| Ex. 26 | 60 | | | 20 | 20 | | | | 0 | 83 | 3.7 | 33 | 0.34 |
| Ex. 27 | 60 | | | 20 | | | | 20 | 0 | 82 | 3.6 | 32 | 0.33 |
| Copo. Ex. 8 | 40 | 20 | | | | 40 | | | 0 | 85 | 1.1 | 34 | 0.38 |
| Copo. Ex. 9 | 78 | 20 | | | | 2 | | | 0 | 64 | 3.6 | 18 | 0.16 |
| Copo. Ex. 10 | 40 | | | 40 | | | | 20 | 0 | 67 | 3.5 | 19 | 0.19 |
| Copo. Ex. 11 | 78 | | | 2 | | | | 20 | −2.2 | 84 | 3.5 | 34 | 0.35 |

Table 2 shows that the repetition of temperature raising and lowering did not lead to leak increases in Examples 1 to 19 involving the components within the scope of the invention. The fuel utilization factors were 80% or more, satisfactory values. The cell strengths were 3 kg/mm$^2$ or more, similarly satisfactory values.

The role of NiO with a mean particle diameter of 0.5 to 3 μm is assumed to contribute to suppressing the leak increase during heat cycle. In Comparative Example 7 with a small content of NiO with a mean particle diameter of 0.5 to 3 μm, a leak increase during heat cycle was observed. This effect may be ascribed to an increase in the thermal expansion coefficient of the base tube. The same effect of suppressing the leak increase can be expected of CoO and Fe$_2$O$_3$.

NiO with a mean particle diameter of 0.5 to 3 μm also. has the action of densifying the base tube. The Comparative Examples using the components outside the scope of the invention led to decreases in the fuel utilization factor, as demonstrated by the results of Comparative Examples 1 and 6.

The role of NiO with a mean particle diameter of 5 to 200 μm is considered to contribute to increasing the fuel utilization factor. This is clear from the finding in Comparative Example 5 that when the amount of NiO with a mean particle diameter of 5 to 200 μm was small, the fuel utilization factor was low. NiO with a mean particle diameter of 5 to 200 μm is also effective in enhancing the cell strength. Deviation from the scope of the components of the invention leads to decreased strength, as demonstrated by Comparative Examples 2 to 3.

Table 3 shows that the same effects as described above were confirmed in Examples 20 to 27 each of which used a base tube containing 5 to 30% by weight of one or more of NiO, CoO and Fe$_2$O$_3$ with a mean particle diameter of 0.5 to 3 μm, and 5 to 30% by weight of one or more of NiO, CoO and Fe$_2$O$_3$ with a mean particle diameter of 5 to 200 μm. By contrast, a decrease in cell strength was noted in Comparative Example 8 in which the content of the coarse particles added was outside the scope of the invention, while a decrease in fuel utilization factor was noted in Comparative Example 9 in which the content of the coarse particles added was outside the scope of the invention. Furthermore, the fuel utilization factor decreased in Comparative Example 10 in which the amount of the fine particles added was more than in the scope of the invention. A leak increase during heat cycle was observed in Comparative Example 11 in which the amount of the fine particles added was less than in the scope of the invention.

<Examples 28 to 48, Comparative Examples 12 to 18, Examples 49 to 56, and Comparative Examples 19 to 22>

Tables 4 and 5 show the compositions of a composite material for a base tube (base material portion) comprising a porous tube according to the present invention indicated in FIG. 1.

On the surface of the base tube 1, there were laminated a 100μm thick fuel electrode 2 comprising an Ni-zirconia thermit, a 100 μm thick electrolyte 3 comprising YSZ, and a 1,000 μm thick air electrode 4 comprising LaMnO$_3$ doped with Sr in a proportion of 0.1. Further, a conductive connecting material 5 comprising LaCrO$_3$ was laminated for connecting the fuel electrode 2 with the air electrode 4 to make a cell. Rapid temperature raising and lowering cycles of the cell were repeated, and then changes in its leak were compared. The porosity and the cell electrical efficiency were also measured. The results are shown in Tables 4 and 5. The compositions in the Examples that are shown in Tables 4 and 5 successfully suppressed the increase in leak. The fuel utilization factor was also increased.

In the present Examples, the materials indicated in Tables 4 and 5 were prepared for use as ceramic materials for the base tube 1. The base tube 1 was prepared by extrusion. Methyl cellulose, glycerin, water, and a stearate emulsion as a lubricant were used as extrusion auxiliaries. The amounts of these auxiliaries used were 4 parts by weight, 5 parts by weight, 10 parts by weight, and 0.2 part by weight for 10 parts by weight of the ceramic materials. The stearate emulsion had a solids concentration of 15% by weight, and contained water as a dispersion medium.

Production of the base tube according to the present Examples is described below.

First, the ceramic materials and methyl cellulose were weighed in given proportions, placed in a high speed mixer, and mixed for 3 minutes. Then, water, glycerin, and a stearate emulsion were weighed, and added to the mixture, followed by mixing for 1 minute. Then, the mixture was kneaded by means of a twin screw kneader, and formed into a cylindrical product with the use of an extruder. After formation, the product was dried for 24 hours at 60° C., and coated with materials for electrodes. Then, the coated product was heat treated for 2 hours at 1,400° C. to make a fuel cell.

Each of the resulting cells was subjected to 5 cycles of temperature raising and lowering from room temperature to the power generation temperature and vice versa at a rate of 200° C./hour. Changes in cell performance were examined in this manner. The results of the Examples according to the invention are shown in Tables 4 and 5, along with the results of Comparative Examples outside the scope of the invention for elucidating the effects of the invention.

to 48 involving the components within the scope of the invention. The fuel utilization factors were 80% or more, satisfactory values. The cell strengths were 3 kg/mm$^2$ or more, similarly satisfactory values.

TABLE 4

| | Composition (% by weight) | | | | | | | | | | Properties of cell | | | | |
|---|---|---|---|---|---|---|---|---|---|---|---|---|---|---|---|
| | CaO-stabilized ZrO$_2$ | CaTiO$_3$ | | | | | | NiO | | | Leak increase during heat cycle | Fuel utilization factor | Cell strength | Porosity | Cell electrical |
| Mean Particle diameter (μm) | 1.2 | 0.2 | 0.5 | 10 | 200 | 300 | 500 | 5 | 20 | 200 | 300 | (%/cycle) | (%) | (kg/mm$^2$) | (%) | efficiency |
| Ex. 28 | 90 | | 5 | | | | | 5 | | | | 0 | 83 | 4.4 | 32 | 0.34 |
| Ex. 29 | 65 | | 5 | | | | | | 30 | | | 0 | 84 | 3.9 | 34 | 0.35 |
| Ex. 30 | 90 | | 5 | | | | | | | 5 | | 0 | 84 | 3.4 | 34 | 0.35 |
| Ex. 31 | 65 | | 5 | | | | | | | | 30 | 0 | 87 | 3.4 | 37 | 0.37 |
| Ex. 32 | 65 | | 30 | | | | | 5 | | | | 0 | 82 | 4 | 30 | 0.34 |
| Ex. 33 | 40 | | 30 | | | | | | 30 | | | 0 | 84 | 3.4 | 34 | 0.35 |
| Ex. 34 | 65 | | 30 | | | | | | | 5 | | 0 | 86 | 3.5 | 37 | 0.36 |
| Ex. 35 | 40 | | 30 | | | | | | | | 30 | 0 | 84 | 3.4 | 33 | 0.35 |
| Ex. 36 | 90 | | | 5 | | | | 5 | | | | 0 | 81 | 3.2 | 27 | 0.34 |
| Ex. 37 | 65 | | | 5 | | | | | 30 | | | 0 | 84 | 3.5 | 32 | 0.35 |
| Ex. 38 | 90 | | | 5 | | | | | | 5 | | 0 | 84 | 3.2 | 33 | 0.35 |
| Ex. 39 | 65 | | | 5 | | | | | | | 30 | 0 | 87 | 3.5 | 37 | 0.40 |
| Ex. 40 | 65 | | | 30 | | | | 5 | | | | 0 | 84 | 3.5 | 32 | 0.37 |
| Ex. 41 | 40 | | | 30 | | | | | 30 | | | 0 | 87 | 3.6 | 37 | 0.40 |
| Ex. 42 | 65 | | | 30 | | | | | | 5 | | 0 | 82 | 3.6 | 30 | 0.37 |
| Ex. 43 | 40 | | | 30 | | | | | | | 30 | 0 | 87 | 3.5 | 37 | 0.39 |
| Ex. 44 | 40 | | | | 30 | | | | | | 30 | 0 | 88 | 3.4 | 35 | 0.40 |
| Ex. 45 | 40 | | | | | 30 | | | | | 30 | 0 | 88 | 3.5 | 37 | 0.40 |
| Ex. 46 | 90 | | | | 5 | | | 5 | | | | 0 | 80 | 3.4 | 27 | 0.36 |
| Ex. 47 | 60 | | | | 20 | | | | 20 | | | 0 | 84 | 3.6 | 32 | 0.38 |
| Ex. 48 | 40 | | | | 30 | | | | 30 | | | 0 | 86 | 3.4 | 36 | 0.39 |
| Comp. Ex. 12 | 60 | 20 | | | | | | | 20 | | | 0 | 60 | 3.5 | 15 | 0.16 |
| Comp. Ex. 13 | 60 | | | 20 | | | | | | | 20 | 0 | 83 | 1.2 | 32 | 0.37 |
| Comp. Ex. 14 | 60 | 20 | | | | | | | | | 20 | 0 | 84 | 0.9 | 34 | 0.36 |
| Comp. Ex. 15 | 40 | | | 20 | | | | | | 40 | | 0 | 87 | 0.8 | 37 | 0.37 |
| Comp. Ex. 16 | 78 | | | 20 | | | | | | 2 | | 0 | 63 | 3.6 | 16 | 0.15 |
| Comp. Ex. 17 | 40 | | | 40 | | | | | 20 | | | 0 | 59 | 4.2 | 14 | 0.14 |
| Comp. Ex. 18 | 78 | | | 2 | | | | | 20 | | | −1.8 | 81 | 4.1 | 27 | 0.33 |

TABLE 5

| | Composition (% by weight) | | | | | | | | Properties of cell | | | | |
|---|---|---|---|---|---|---|---|---|---|---|---|---|---|
| | CaO-stabilized ZrO$_2$ | CaTiO$_3$ | SrTiO$_3$ | Ba$_2$O$_3$ | NiO | CoO | CoO | Fe$_2$O$_3$ | Leak increase during heat cycle | Fuel utilization factor | Cell strength | Porosity | Cell electrical |
| Mean Particle diameter (μm) | 1.2 | 10 | 10 | 10 | 20 | 20 | 200 | 20 | (%/cycle) | (%) | (kg/mm$^2$) | (%) | efficiency |
| Ex. 49 | 60 | 20 | | | 20 | | | | 0 | 85 | 3.6 | 33 | 0.355 |
| Ex. 50 | 60 | 20 | | | | | | 20 | 0 | 84 | 3.5 | 34 | 0.388 |
| Ex. 51 | 60 | | 20 | | 20 | | | | 0 | 82 | 3.6 | 29 | 0.344 |
| Ex. 52 | 60 | | 20 | | | 20 | | | 0 | 83 | 3.5 | 32 | 0.377 |
| Ex. 53 | 60 | | 20 | | | | | 20 | 0 | 85 | 3.6 | 33 | 0.366 |
| Ex. 54 | 60 | | | 20 | 20 | | | | 0 | 83 | 3.5 | 31 | 0.377 |
| Ex. 55 | 60 | | | 20 | | 20 | | | 0 | 84 | 3.6 | 34 | 0.355 |
| Ex. 56 | 60 | | | 20 | | | | 20 | 0 | 84 | 3.7 | 34 | 0.377 |
| Copo. Ex. 19 | 40 | | 20 | | | 40 | | | 0 | 83 | 1.3 | 32 | 0.377 |
| Copo. Ex. 20 | 78 | | 20 | | | 2 | | | 0 | 64 | 3.4 | 18 | 0.166 |
| Copo. Ex. 21 | 40 | | | 40 | | | | 20 | 0 | 67 | 3.4 | 19 | 0.144 |
| Copo. Ex. 22 | 78 | | | 2 | | | | 20 | −1.9 | 85 | 3.5 | 33 | 0.388 |

Table 4 shows that the repetition of temperature raising and lowering did not lead to leak increases in Examples 28

The role of CaTiO$_3$ with a mean particle diameter of 0.5 to 200 μm is assumed to contribute to suppressing the leak increase during heat cycle. This is evidenced by the finding that an increase in leak during heat cycle was observed in Comparative Example 18 with a small content of $CaTiO_3$ with a mean particle diameter of 0.5 to 200 μm. This effect may be ascribed to an increase in the thermal expansion coefficient of the base tube. The same effect of suppressing the leak increase can be expected of $SrTiO_3$, $BaTiO_3$, CaO and MgO.

$CaTiO_3$ with a mean particle diameter of 0.5 to 200 μm also has the action of densifying the base tube. Deviation from the scope of the components according to the invention leads to decreases in the fuel utilization factor, as demonstrated by the results of Comparative Examples 12 and 17.

The role of NiO with a mean particle diameter of 5 to 200 μm is considered to contribute to increasing the fuel utilization factor. This is clear from the finding in Comparative Example 16 that when the amount of NiO with a mean particle diameter of 5 to 200 μm was small, the fuel utilization factor was low. NiO with a mean particle diameter of 5 to 200 μm is also effective in enhancing the cell strength. Deviation from the scope of the components of the invention leads to decreased strength, as demonstrated by Comparative Examples 13 to 15. The same effect can be expected of CoO and $Fe_2O_3$.

Even with $CaTiO_3$ with mean particle diameters of 300 and 500 μm, as shown in Examples 44 and 45, increases in porosity and cell strength were both preferred.

Table 5 shows that the same effects as described above were confirmed in Examples 49 to 56 each of which used a base tube containing 5 to 30% by weight of one or more of $CaTiO_3$, $SrTiO_3$, and $BaTiO_3$ with a mean particle diameter of 0.5 to 200 μm, and 5 to 30% by weight of one or more of NiO, CoO and $Fe_2O_3$ with a mean particle diameter of 5 to 200 μm. By contrast, a decrease in cell strength was noted in Comparative Example 19 in which the content of the coarse particles added was outside the scope of the invention, while a decrease in fuel utilization factor was noted in Comparative Example 20 in which the content of the coarse particles added was outside the scope of the invention. Furthermore, the fuel utilization factor decreased in Comparative Example 21 in which the amount of the fine particles added was more than that within the scope of the invention. A leak increase during heat cycle was observed in Comparative Example 22 in which the amount of the fine particles added was less than that within the scope of the invention.

Examples 57 to 59>

Table 6 shows the compositions of a composite material for a base tube (base material portion) 1 comprising a porous tube according to the present invention indicated in FIG. 1. In the present Examples, NiO was used as fine particles added, and calcia-stabilized zirconia (CSZ) was used as coarse particles added.

On the surface of the base tube 1, there were laminated a 100 μm thick fuel electrode 2 comprising an Ni-zirconia thermit, a 100 μm thick electrolyte 3 comprising YSZ, and a 1,000 μm thick air electrode 4 comprising $LaMnO_3$ doped with Sr in a proportion of 0.1. Further, a conductive connecting material 5 comprising $LaCrO_3$ was laminated for connecting the fuel electrode 2 with the air electrode 4 to make a cell. Rapid temperature raising and lowering cycles of the cell were repeated, and then changes in its leak were compared. The porosity and the cell electrical efficiency were also measured.

TABLE 6

| | Composition (% by weight) | | | | | | Properties of cell | | | | |
| --- | --- | --- | --- | --- | --- | --- | --- | --- | --- | --- | --- |
| | CaO-stabilized $ZrO_2$ | NiO | | CaO-stabilized $ZrO_2$ | | | Leak increase during heat cycle | Fuel utilization factor | Cell strength | Porosity | Cell electrical |
| Mean Particle diameter (μm) | 1.2 | 1.5 | 20 | 20 | 300 | 500 | (%/cycle) | (%) | (kg/mm²) | (%) | efficiency |
| Ex. 57 | 40 | 20 | 20 | 20 | | | 0 | 83 | 3.8 | 33 | 0.37 |
| Ex. 58 | 40 | 20 | 20 | | 20 | | 0 | 75 | 3.5 | 35 | 0.38 |
| Ex. 59 | 40 | 20 | 20 | | | 20 | 0 | 88 | 3.3 | 37 | 0.40 |

Table 6 shows that repetition of temperature raising and lowering in the base tubes of Examples 57 to 59 did not result in leak increases. The fuel utilization factors were 80% or more, satisfactory values. The cell strengths were 3 kg/mm² or more, similarly satisfactory values.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are,intended to be included within the scope of the appended claims.

The entire disclosure of Japanese Patent Application No. 11-204278 filed on Jul. 19, 1999 including specification, claims, drawings and summary is incorporated herein by reference in its entirety.

What is claimed is:

1. A base tube for a fuel cell, comprising:
   a raw material for the base tube of fine particles of calcia-stabilized zirconia (CSZ), and
   fine particles having the same particle diameter as the particle diameter of the raw material are mixed with the raw material, the fine particles being selected from the group consisting of $Fe_2O_3$, $CaTiO_3$, $SrTiO_3$, and $BaTiO_3$ and its mixtures,
   whereby a mixture of the fine particles and the raw material shrinks nonuniformly when sintered to increase the porosity of the base tube.

2. The base tube for a fuel cell as cell as in claim 1, wherein:
   the mean particle diameter of the raw material for the base tube is 0.5 to 2 μm.

3. The base tube for a fuel cell as in claim 1, wherein:
the mixture contains 10 to 40% by weight of the fine particles.

4. A base tube for a fuel cell, comprising:
a raw material for the base tube of calcia-stabilized zirconia (CSZ) having a mean particle diameter of 0.5 to 2 μm, and
coarse particles having particle diameters of 5 μm or more are mixed with the raw material, the coarse particles being selected from the group consisting of $Fe_2O_3$, $CaTiO_3$, $SrTiO_3$, and $BaTiO_3$ and its mixtures,
whereby a mixture of the coarse particles and the raw material shrinks nonuniformly when sintered to increase the porosity of the base tube.

5. The base tube for a fuel cell as claimed in claim 4, wherein:
the mixture contains 10 to 40% by weight of the coarse particles.

6. A base tube for a fuel cell, comprising:
a raw material for the base tube of calcia-stabilized zirconia (CSZ) having a mean particle diameter of 0.5 to 2 μm, and
fine particles having particle diameters of 0.5 to 3 μm, and coarse particles having particle diameters of 5 μm or more are mixed with the raw material, the fine particles being selected from the group consisting of $Fe_2O_3$, $CaTiO_3$, $SrTiO_3$, and $BaTiO_3$ and its mixtures, and the coarse particles being selected from the group consisting of $Fe_2O_3$, $CaTiO_3$, $SrTiO_3$, and $BaTiO_3$ and its mixtures,
whereby a mixture of the fine particles, the coarse particles and the raw material shrinks nonuniformly when sintered to increase the porosity of the base tube.

7. The base tube for a fuel cell as claimed in claim 6, wherein:
the mixture contains 5 to 30% by weight of the fine particles and 5 to 30% by weight of the coarse particles.

8. A material for a base tube for a solid electrolyte fuel cell, the solid electrolyte fuel cell being produced by laminating a film of a fuel electrode, a film of an electrolyte, and a film of an air electrode in this order on a surface of the base tube,
said material for the base tube comprising:
a mixture of a raw material for the base tube, and coarse particles, the raw material being calcia-stabilized zirconia (CSZ) having a mean particle diameter of 0.5 to 2 μm, and the coarse particles having particle diameters of 5 μm or more and being selected from the group consisting of $Fe_2O_3$, $CaTiO_3$, $SrTiO_3$, and $BaTiO_3$ and its mixtures.

9. The base tube for a fuel cell as claimed in claim 8, wherein:
the mixture contains 10 to 40% by weight of the coarse particles.

10. A material for a base tube for a solid electrolyte fuel cell, the solid electrolyte fuel cell being produced by laminating a film of a fuel electrode, a film of an electrolyte, and a film of an air electrode in this order on a surface of the base tube,
said material for the base tube comprising a mixture of:
calcia-stabilized zirconia (CSZ) having a mean particle diameter of 0.5 to 2 μm, 5 to 30% by weight, based on the CSZ, of fine particles having a mean particle diameter of 0.5 to 3 μm, the fine particles being $Fe_2O_3$, and
5 to 30% by weight, based on the CSZ, of coarse particles having a mean particle diameter of 5 μm or more, the coarse particles being selected from the group consisting of $Fe_2O_3$, and CaO-stabilized $ZrO_2$ and its mixtures,
whereby the mixture shrinks nonuniformly when sintered to increase the porosity of the base tube.

11. A material for a base tube for a solid electrolyte fuel cell, the solid electrolyte fuel cell being produced by laminating a film of a fuel electrode, a film of an electrolyte, and a film of an air electrode in this order on a surface of the base tube,
said material for the base tube comprising a mixture of:
calcia-stabilized zirconia (CSZ) having a mean particle diameter of 0.5 to 2 μm;
5 to 30% by weight, based on the CSZ, of the group consisting of $CaTiO_3$, $SrTiO_3$, $BaTiO_3$, and CaO-stabilized $ZrO_2$ and its mixtures having a mean particle diameter of 0.5 μm or more; and
5 to 30% by weight, based on the CSZ, of $Fe_2O_3$ having a mean particle diameter of 5 μm or more,
whereby the mixture shrinks nonuniformly when sintered to increase the porosity of the base tube.

12. The base tube for a fuel cell as in claim 2, wherein, the mixture contains 10 to 40% by weight of the fine particles.

* * * * *